United States Patent Office 3,751,498
Patented Aug. 7, 1973

3,751,498
PREPARATION OF n-ALKYLBENZENES
Louis Schmerling, Riverside, Ill., assignor to Universal Oil Products Company, Des Plaines, Ill.
No Drawing. Filed May 12, 1972, Ser. No. 252,786
Int. Cl. C07c 15/02
U.S. Cl. 260—668 D                                    10 Claims

ABSTRACT OF THE DISCLOSURE

Benzene compounds containing an alkyl substituent which is normal in configuration are prepared by alkylating cyclohexane with 1-alkenes in the presence of a free-radical generating compound and hydrogen chloride and thereafter dehydrogenating the n-alkylcyclohexane in the presence of a dehydrogenation catalyst to form the desired n-alkylbenzenes.

---

This invention relates to a process for the preparation of alkylated benzenes. More particularly this invention is concerned with a process for preparing alkyl substituted benzenes which are normal in configuration.

Heretofore it has been known that when benzene is alkylated with a 1-alkene in the presence of an acidic catalyst such as sulfuric acid, hydrogen fluoride or the Friedel-Crafts type Lewis acids such as aluminum chloride, ferric chloride, zirconium chloride, the product which is obtained thereby is a secondary alkylbenzene. In some instances, it is preferred that the alkylated benzene have a primary alkyl group. For example, n-butylbenzene is used as an intermediate in organic syntheses. Likewise n-nonylbenzene is used as a raw material for the manufacture of surface-active agents. When the alkyl substituent is of a relatively high molecular weight such as decyl, undecyl, dodecyl, tridecyl, tetradecyl, etc. alkyl substituents on the benzene ring, it is preferred that the substituents be straight-chained and primary in order that the decylbenzene, undecylbenzene, dodecylbenzene, etc. may be used in the preparation of detergents of the alkylaryl sulfonate type which are biodegradable in nature. The biodegradable aspect of detergents has become increasingly important in the immediate past and will become more important in the furture inasmuch as the presence of foams and suds on the surface of many ponds, pools, lakes, streams, rivers, etc. has resulted in a source of pollution respecting the water supply of many towns, villages, or cities. The presence of these foams and suds is due in part to the non-biodegradable aspect of many of the detergents, the use of which has increased greatly in the past few years. However, by utilizing alkylaryl sulfonates in which the alkyl side chain is primary and straight-chained in configuration, it is possible to provide a biodegradable nature to the detergents and thus avoid the build-up of the aforesaid foams or suds.

It is therefore an object of this invention to provide a process for preparing n-alkylbenzenes.

A further object of this invention is to provide a process for alkylating cyclohexane with a 1-alkene to obtain a normal alkylcyclohexane and thereafter dehydrogenate the latter to form a desired and useful product.

In one aspect an embodiment of this invention resides in a process for the preparation of an n-alkylbenzene which comprises alkylating cyclohexane with a 1-alkene in the presence of a catalyst comprising a free-radical generating compound and a promoter comprising hydrogen chloride at alkylation conditions to form an n-alkylcyclohexane, dehydrogenating said n-alkylcyclohexane in the presence of a dehydrogenation catalyst at dehydrogenation conditions, and recovering the resultant n-alkylbenzene.

A specific embodiment of this invention is found in a process for preparing n-octylbenzene by alkylating cyclohexane with 1-octene in the presence of di-t-butyl peroxide and concentrated hydrochloric acid at a temperature at least as high as the decomposition temperature of said di-t-butyl peroxide to form n-octylcyclohexane, dehydrogenating said n-octylcyclohexane in the presence of nickel composited on kieselguhr at a temperature in the range of from 200° to 400° C., and recovering the desired n-octylbenzene.

Other objects and embodiments will be found in the following further detailed description of the present invention.

As hereinbefore set forth the present invention is concerned with a process for preparing n-alkylbenzenes, said process being effected in a two-step manner in which the first step comprises the alkylation of cyclohexane with a 1-alkene in the presence of certain catalytic compositions of matter of a type hereinafter set forth in greater detail. Suitable 1-alkenes which are used as alkylating agents for the first step of the process of the present invention will include 1-alkenes containing from 2 to about 16 carbon atoms in length such as ethylene, propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene. The catalysts which are used in effecting the alkylation of the cyclohexane with the aforementioned 1-alkenes are those which are capable of forming free radicals under the reaction conditions. By utilizing such a catalyst it is possible to effect the alkylation in such a manner so that a normal alkylcyclohexane is obtained, rather than a secondary alkylbenzene which will result if the alkylation were effected in the presence of an acidic catalyst of the Friedel-Crafts type, sulfuric acid, etc. The catalysts which are used in the process of this invention will include peroxy compounds, containing the bivalent radical, —O—O—, which decomposes to form free radicals which initiate the general reaction of the present invention and which are capable of inducing the alkylation of the cyclohexane and the 1-alkene. Examples of these catalysts include the persulfates, perborates, percarbonates of ammonium and the alkali metals, or organic peroxy compounds. The organic peroxy compounds constitute a preferred class of catalysts for use in the invention and include peracetic acid, persuccinic acid, dimethyl peroxide, diethyl peroxide, dipropyl peroxide, di-t-butyl peroxide, butyryl peroxide, lauroyl peroxide, benzoyl peroxide, Tetralin peroxide, urea peroxide, t-butyl perbenzoate, t-butyl hydroperoxide, methylcyclohexyl hydroperoxide, cumene hydroperoxide, diisopropylbenzyl hydroperoxide, etc. Mixtures of peroxy compound catalysts may be employed or the peroxy compound catalyst may be utilized in admixture with various diluents. Thus, organic peroxy compounds which are compounded commercially with various diluents which may be used include benzoyl peroxide compounded with calcium sulfate, benzoyl peroxide compounded with camphor, etc. Only catalytic amounts (less than stoichiometric amounts) need be used in the process.

The reaction of the present process involving the aforementioned starting materials is effected at elevated reaction temperatures which should be at least at high as the initial decomposition temperature of the free radical generating catalyst, such as the peroxide compound, in order to liberate and form free radicals which promote the reaction. In selecting a particular reaction temperature for use in the process of the present invention, two considerations must be taken into account. First sufficient energy by means of heat must be supplied to the reaction so that reactants, namely the cyclohexane and the 1-alkenes will be activated sufficiently for condensation to take place when free radicals are generated by the catalyst. Second, free-radical generating catalysts such as peroxy compounds, particularly organic peroxides, decompose at a measurable rate with time in a logarithmic function dependent upon temperature. This rate of decomposition can be and ordinarily is expressed as the half life of a peroxide at a particular temperature. For example, the half life in hours for di-t-butyl peroxide is 17.5 hours at 125° C., 5.3 hours at 135° C., and 1.7 hours at 145° C. (calculated from data for the first 33% decomposition). A reaction system temperature must then be selected so that the free-radical generating catalyst decomposes smoothly with the generation of free radicals at a half life which is not too long. In other words, sufficient free radicals must be present to induce the present chain reaction to take place, and these radicals must be formed at a temperature at which the reactants are in a suitably activated state for condensation. When the half life of the free-radical generating catalyst is greater than 10 hours, radicals are not generated at a sufficient rate to cause the reaction of the process of the present invention to go forward at a desirable rate. Thus the reaction temperature may be within the range of from about 50° to about 300° C. and at least as high as the decomposition temperature of the catalyst, by which is meant a temperature such as the half life of the free-radical generating catalyst is not greater than 10 hours. Since the half life for each free-radical generating catalyst is different at different temperatures, the exact temperature to be utilized in a particular reaction will vary. However, persons skilled in the art are well acquainted with the half life vs. temperature data for different free-radical generating catalysts. Thus it is within the skill of one familiar with the art to select the particular temperature needed for any particular catalyst. However, the operating temperatures generally do not exceed the decomposition temperature of the catalyst by more than 150° C. since free-radical generating catalysts decompose rapidly under such conditions. For example, when a free-radical generating catalyst such as t-butyl perbenzoate is used, having a decomposition temperature of approximately 115° C., the operating temperature of the process is from about 115° to about 265° C. When di-t-butyl peroxide having a decomposition temperature of about 130° C. is used, the process is run at a temperature ranging from about 130° to about 280° C. Higher reaction temperatures may be employed, but little advantage is gained if the temperature is more than the hereinbefore mentioned 150° C. higher than the decomposition temperature of the catalyst. The general effect of increasing the operating temperature is to accelerate the rate of condensation reaction of the cyclohexane and the 1-alkenes. However, the increased rate of reaction is accompanied by certain amounts of decomposition. In addition to the elevated temperatures which are utilized, the reaction may also be effected at elevated pressures ranging from about 1 to about 100 atmospheres or more, the preferred operating pressure of the process being that which is required to maintain a substantial portion of the reactants in liquid phase. Pressure is not an important variable in the process of this invention. However, because of the low boiling points of some of the reactants it is necessary to utilize pressure withstanding equipment to insure liquid phase conditions. In batch type operations it is often desirable to utilize pressure withstanding equipment to charge the reactants and catalyst to the vessel and to pressure the vessel with 10 or 30 or 50 or more atmospheres with an inert gas such as nitrogen. This helps to insure the presence of liquid phase conditions. However, when the mole quantity of reactants is sufficient, the pressure which they themselves generate at the temperature utilized is sufficient to maintain the desired phase conditions. Furthermore, the concentration of the catalyst employed in this process may vary over a rather wide range but it is desirable to utilize low concentrations of catalysts such as from about 0.1% to about 10% of the total weight of the combined starting materials charged to the process. The reaction time may be within the range of from less than one minute to several hours, depending upon temperature and the half life of the catalyst. Generally speaking, contact times of at least 10 minutes are preferred.

As hereinbefore set forth the alkylation of the cyclohexane with the 1-alkene in the presence of a catalyst of the type hereinbefore set forth in greater detail is also effected in the presence of hydrogen chloride. The hydrogen chloride is used as a promoter for the reaction and also is used to prevent or inhibit telomerization, said telomerization being a polymerization reaction in which undesired side reaction products may be formed. The hydrogen chloride may be present as anhydrous hydrogen chloride, as concentrated hydrochloric acid or as an aqueous solution of hydrochloric acid, the hydrogen chloride being present in an amount of from about 5% to about 38% in said aqueous solution.

The n-alkylcyclohexane which is prepared by the alkylation of cyclohexane with a 1-alkene in the presence of a free-radical generating compound and hydrogen chloride is then subjected to dehydrogenation whereby the cyclic portion of the molecule undergoes dehydrogenation without effecting the alkyl side chain. This dehydrogenation is effected in the presence of dehydrogenation catalysts which are well-known in the art and which may include such catalysts as chromia on alumina (as such as modified with an alkali metal or alkaline earth metal, zinc compounds or beryllia), nickel composited on alumina, nickel composited on kieselguhr, palladium composited on alumina, platinum composited on alumina, the alumina being in gamma, eta or theta form, etc. The aforesaid dehydrogenation will be effected over a relatively wide range of operating conditions, the conditions of temperature and pressure which are utilized being dependent to a large extent upon the type of catalysts which are employed in the reaction. The aforesaid operating conditions will include temperatures in the range of from about 200° up to 400° C. and pressures ranging from subatmospheric, i.e., partial vacuum, up to about 25 atmospheres or more, the amount of pressure which is employed being that which is sufficient to maintain a major portion of the reactants in the liquid phase. For example, when utilizing a nickel catalyst composited on a solid support such as alumina, kieselguhr, silica, silica-alumina, activated carbon, etc. it will be preferred to effect the dehydrogenation at temperatures above about 250° C. Likewise when utilizing the catalyst such as palladium or paltinum composited on a solid support, the dehydrogenation may be effected at temperatures above 200° C. up to about 300° C.

The process of this invention may be effected in any suitable manner and may comprise either a batch or continuous type operation. For example, when a batch type operation is used, a quantity of the cyclohexane, the catalyst and hydrogen chloride, if in liquid form, are placed in an appropriate apparatus such as, for example, an autoclave of the rotating or mixing type. In addition, if the 1-alkene is in liquid form, it is also placed in the apparatus. Conversely speaking if the 1-alkene and/or hydrogen chloride is in gaseous form, the apparatus is sealed and the 1-alkene and/or hydrogen chloride is then charged thereto in an amount in the range of from 1:1 up to 10:1 moles of cyclohexane per mole of 1-alkene. In the event that the 1-alkene is not in gaseous form, the desired operating pressure for the reaction may be obtained by the introduction of a substantially inert gas such as nitrogen into the reaction zone. Alternatively speaking, it is possible that the 1-alkene may provide all of the required operating pressure or a portion thereof, the remainder of the pressure being afforded by the introduction of the aforesaid inert gas. Following this, the reactor is then heated to the desired operating temperature, which as hereinbefore set forth is at least as high as the decomposition temperature of the free-radical generating compound which acts as the catalyst for this reaction, and preferably in a range of from the aforesaid decomposition temperature to 150° C. higher than said decomposition temperature. Upon completion of the desired residence time which may range from 0.5 up to about 10 hours or more in duration, heating is discontinued and the reactor is allowed to return to room temperature. The excess pressure is discharged, the autoclave is opened, and the reaction mixture is recovered therefrom. This mixture is then subjected to conventional means of separation which may include washing, drying, extraction, fractional distillation under reduced pressure, etc., whereby the desired n-alkylcyclohexane is separated and recovered from any unreacted starting materials, hydrogen chloride compound, undesired side reaction products, etc.

The n-alkylcyclohexane which has been prepared according to the first step of this process is then subjected to dehydrogenation by treatment with a dehydrogenating catalyst of the type known in the art. One such method of effecting the dehydrogenation is to place a quantity of the n-alkylcyclohexane in an appropriate apparatus along with the dehydrogenation catalyst such as nickel composited on silica or kieselguhr or platinum composited on a refractory inorganic oxide such as alumina, the preferred type of alumina being in the gamma or eta form. The reaction vessel is then pressurized or evacuated until the desired operating pressure is reached and thereafter heated to a predetermined operating temperature within the range hereinbefore set forth. After treatment at the desired operating conditions of temperature and pressure for a predetermined residence time which may range from 0.5 to about 10 hours or more in duration, the reaction is halted, the apparatus is allowed to return to atmospheric pressure and ambient temperature and the reaction mixture is recovered therefrom. After separation from the catalyst by filtration, the mixture is then subjected to conventional means of purification of the type hereinbefore set forth whereby the desired n-alkylbenzene is separated from any unreacted starting material and recovered. Alternatively, the liquid product may be recovered by distillation from the hot autoclave, a procedure which is often preferred because it prevents rehydrogenation of the alkylbenzene during the above-mentioned cooling process.

It is also contemplated within the scope of this invention that the process described may be effected in a continuous manner of operation. When such a type of operation is used, the cyclohexane, the 1-alkene and the catalyst comprising a free-radical generating compound are continuously charged to a reaction zone which is maintained at the suitable operating conditions of temperature and pressure. In addition the hydrogen chloride in anhydrous form or as hydrochloric acid is also continuously charged to the reaction zone. The aforesaid reactants may be charged to the reactor through separate lines or, if so desired, one of of the reactants or both may be admixed with the catalyst before admittance to said reactor and the mixture charged thereto in a single stream. After completion of the desired residence time, the reactor effluent is continuously removed and subjected to conventional means of separation whereby the n-alkylcyclohexane is separated from any unreacted starting material, catalyst and hydrogen chloride, the latter three being recycled to the reaction zone to form a portion of the feed stock.

The n-alkylcyclohexane which had been separated from the other materials present in the reaction mixture resulting from the alkylation step is then continuously charged to a reactor which contains a dehydrogenation catalyst. The feed stream is heated to the desired operating temperature and passed into contact with the catalyst which may be maintained as a fixed bed of catalyst particles in the reactor or as a moving bed in which the n-alkylcyclohexane is passed through the reactor either concurrently or countercurrently to the moving bed of catalyst. Following passage through the reactor and after contact with the catalyst, the reactor effluent is continuously withdrawn from the reactor, cooled, and passed into a separation zone wherein the hydrogen gas phase separates from the hydrocarbon liquid phase, the latter phase containing the dehydrogenated product, unconverted n-alkylcyclohexane and a minor amount of side products which may have formed during the dehydrogenation reaction. The liquid phase is withdrawn from the separation zone and subjected to conventional means of separation such as fractional distillation whereby the desired n-alkylbenzene is recovered. The n-alkylbenzene fraction may, if desired, be separated from n-alkylcyclohexane by chromatographic adsorption, for example on silica gel.

It is also contemplated within the scope of this invention that the hydrogen which is formed during the dehydrogenation of the n-alkylcyclohexane may be recovered for use in the hydrogenation of benzene to form cyclohexane, the latter being used as one of the reactants in the first step of the process of this invention.

The following examples are given to illustrate the process of the present invention which, however, are not intended to limit the generally broad scope of the present invention in strict accordance therewith.

EXAMPLE I

A charge stock comprising 100 g. (1.19 mole) of cyclohexane, 54 g. (0.48 mole) of 1-octene, 7 g. of di-t-butyl peroxide and 20 g. of concentrated hydrochloric acid (30% concentration) is placed in the glass liner of a rotating autoclave. The autoclave is sealed and nitrogen pressed in until an initial operating pressure of 30 atmospheres is reached. The autoclave and contents thereof are then heated to a temperature in the range of 130° to 140° C. and maintained thereat for a period of 4 hours, the maximum pressure at this temperature reaching approximately 40 atmospheres. At the end of the 4-hour period, heating is discontinued, the autoclave is allowed to return to room temperature and the final pressure at room temperature of 30 atmospheres is discharged. The autoclave is opened and the reaction mixture is recovered therefrom. This mixture is then subjected to fractional distillation under reduced pressure whereby the desired product comprising n-octylcyclohexane is separated and recovered.

A reactor is loaded with 100 cc. of a catalyst comprising nickel composited on kieselguhr. Following this a feed stream comprising n-octylcyclohexane prepared according to the above paragraph is heated to a temperature of 300° C. and passed over the aforesaid catalyst at this temperature at a liquid hourly space velocity (the amount of charge per amount of catalyst per hour) of 4 along with hydrogen, said hydrogen being present in a hydrogen to hydrocarbon mole ratio of 2:1. The effluent stream is withdrawn, cooled, and passed into a hydrogen separation zone wherein the hydrogen gas phase separates from the hydrocarbon rich liquid phase. The hydrocarbon rich liquid phase is withdrawn from the separation zone and subjected to chromatographic adsorption on silica gel whereby the desired product comprising n-octylbenzene is separated and recovered.

EXAMPLE II

In this experiment 100 g. (1.19 mole) of cyclohexane, 42 g. (0.5 mole) of 1-hexene along with 3 g. (0.01 mole) of benzoyl peroxide and 20 g. of concentrated hydrochloric acid are heated under reflux at a temperature in the range of from about 80° to 85° C. for a period of 4 hours. At the end of this 4-hour period, heating is discontinued and the reactor is allowed to cool to room temperature. The reaction mixture is then recovered from the reactor and subjected to distillation, first removing the unreacted 1-hexene followed by removal of the unreacted cyclohexane. The n-hexylcyclohexane fraction is distilled over.

A reactor is loaded with 100 g. of a catalyst comprising platinum composited on alumina, the catalyst composite having been treated with potassium hydroxide and the feed stock, comprising the aforesaid n-hexylcyclohexane which has been heated to a temperature of 300° C., is passed therethrough. The n-hexylcyclohexane is charged to the reactor at a liquid hourly space velocity of 4 along with a stream of hydrogen and after passage over the catalyst the effluent stream is withdrawn to a separation zone. After separation of the hydrogen gas from the hydrocarbon liquid phase, the latter is then subjected to distillation whereby the unreacted n-hexylcyclohexane is separated from the desired product comprising n-hexylbenzene which is recovered.

EXAMPLE III

In like manner 100 g. of cyclohexane, 84 g. of 1-dodecene, 7 g. of di-t-butyl peroxide and 30 g. of concentrated hydrochloric acid are placed in the glass liner of a rotating autoclave which is thereafter sealed into the autoclave. Nitrogen is then pressed into the autoclave until an initial operating pressure of 30 atmospheres is reached. The autoclave is then heated to a temperature of 130° C. and maintained in a range of from 130° to 140° C. for a period of 4 hours, following which heating is discontinued, the autoclave is allowed to return to room temperature, and the excess pressure is discharged therefrom. The autoclave is opened and the reaction product is recovered, subjected to conventional means for separation whereby the desired n-dodecyclcyclohexane is separated from unreacted starting material and recovered.

The n-dodecylcyclohexane which is prepared according to the above paragraph is heated to a temperature of about 300° C. and charged along with a nitrogen stream to a reactor containing a dehydrogenation catalyst comprising chromia composited on alumina, the n-dodecylcyclohexane at a liquid hourly space velocity of 4. The reactor effluent stream is continuously withdrawn, cooled and passed to a separation zone whereby the hydrogen gas phase is separated from the hydrocarbon liquid phase. The latter is separated from the separation zone and subjected to distillation whereby the desired product comprising n-dodecylbenzene is recovered.

EXAMPLE IV

A mixture comprising 100 g. of cyclohexane, 49 g. of 1-heptene, 7 g. of di-t-butyl peroxide and 20 g. of concentrated hydrochloric acid is treated in a manner similar to that treated in the above examples, that is, by charging said mixture to an autoclave, pressure with nitrogen, and heating the autoclave to a temperature of 130° C. where it is maintained in a temperature range of from 130° to 140° C. for a period of 4 hours. At the end of this 4-hour period, heating is discontinued, the autoclave is allowed to return to room temperature and the excess pressure is discharged, and the reaction mixture is recovered therefrom. The mixture is treated to conventional means of separation whereby the desired product comprising n-heptylcyclohexane is separated and recovered.

The n-heptlcyclohexane prepared according to the above paragraph along with a nitrogen stream is heated to a temperature of about 300° C. and charged to a reactor containing a dehydrogenation catalyst comprising nickel composited on kieselguhr. As in the case of the above examples, the reactor effluent stream is withdrawn, cooled, and passed to a separation zone where the hydrogen gas phase is separated from the hydrocarbon liquid phase. The latter phase is then subjected to separation means whereby the desired product comprising n-heptylbenzene is separated from unreacted n-heptylcyclohexane and recovered.

EXAMPLE V

To the glass liner of a rotating autoclave is charged 100 g. of cyclohexane, 7 g. of di-t-butyl peroxide and 20 g. of concentrated hydrochloric acid. The autoclave is sealed and 1-butene is charged thereto along with a sufficient amount of nitrogen so that an initial operating pressure of 40 atmospheres is reached, said pressure consisting of 20 atmospheres of 1-butene and 20 atmospheres of nitrogen. Thereafter the autoclave is heated to a temperature of 130° C. and maintained in a range of from 130° to 140° C. for a period of 4 hours, the maximum pressure during this time reaching approximately 55 atmospheres. At the end of the aforementioned period, heating is discontinued, the autoclave is allowed to return to room temperature and the excess pressure is discharged therefrom. The autoclave is opened and the reaction mixture is recovered, subjected to separation means hereinbefore set forth, and the n-butylcyclohexane is recovered.

The n-butylcyclohexane prepared according to the above paragraph is heated to a temperature of approximately 300° C. and charged, along with a hydrogen stream, to a reactor containing a dehydrogenation catalyst comprising platinum composited on gamma-alumina which has been treated with an alkali component comprising lithium nitrate. The charging of the n-butylcyclohexane is done at a liquid hourly space velocity of 4 with an amount of hydrogen sufficient to maintain a hydrogen to hydrocarbon mole ratio of 2:1. The reactor effluent stream is contacted with the catalyst, withdrawn, cooled and passed to a separation zone wherein the hydrogen gas phase is separated from the hydrocarbon liquid phase. The latter phase is then subjected to distillation whereby the desired product comprising n-butylbenzene is separated from unreacted n-butylcyclohexane, the latter being recycled to form a portion of the feed stock for the dehydrogenation step.

I claim as my invention:

1. A process for the preparation of an n-alkylbenzene which comprises alkylating cyclohexane with a 1-alkene in the presence of a catalyst comprising a free-radical generating compound and a promoter comprising hydrogen chloride at alkylation conditions to form an n-alkylcyclohexane, dehydrogenating said n-alkylcyclohexane in the presence of a dehydrogenation catalyst at dehydrogenation conditions, and recovering the resultant n-alkylbenzene.

2. The process as set forth in claim 1 in which said alkylation conditions include a temperature at least as high as the decomposition temperature of said free-radical generating compound and said dehydrogenation conditions include a temperature in the range of from 200° to about 400° C. and a pressure in the range of from subatmospheric to about 25 atmospheres.

3. The process at set forth in claim 1 in which said free-radical generating compound is an organic peroxide compound.

4. The process as set forth in claim 1 in which said dehydrogenation catalyst is nickel composited on kieselguhr.

5. The process as set forth in claim 1 in which said hydrogen chloride is present as a concentrated hydrochloric acid.

6. The process as set forth in claim 1 in which said 1-alkene is 1-octene and said n-alkylbenzene is n-octylbenzene.

7. The process as set forth in claim 1 in which said 1-alkene is 1-hexene and said n-alkylbenzene is n-hexylbenzene.

8. The process as set forth in claim 1 in which said 1-alkene is 1-dodecene and said n-alkylbenzene is n-dodecylbenzene.

9. The process as set forth in claim 1 in which said 1-alkene is 1-heptene and said n-alkylbenzene is n-heptylbenzene.

10. The process as set forth in claim 1 in which said 1-alkene is 1-butene and said n-alkylbenzene is n-butylbenzene.

References Cited

UNITED STATES PATENTS

| | | | |
|---|---|---|---|
| 2,721,884 | 10/1955 | Ruedisulj | 260—668 D |
| 2,780,661 | 2/1957 | Hemminger et al. | 260—688 D |
| 3,277,202 | 10/1966 | Benson et al. | 260—666 A |

CURTIS R. DAVIS, Primary Examiner

U.S. Cl. X.R.

260—666 A, 666 P, 671 R